(12) United States Patent
Moses

(10) Patent No.: US 8,751,173 B1
(45) Date of Patent: Jun. 10, 2014

(54) MANAGEMENT OF RESPONSE TO TRIGGERING EVENTS IN CONNECTION WITH MONITORING FUGITIVE EMISSIONS

(75) Inventor: Rex Moses, Nassau Bay, TX (US)

(73) Assignee: LDARtools, Inc., Dickinson, TX (US)

( * ) Notice: Subject to any disclaimer, the term of this patent is extended or adjusted under 35 U.S.C. 154(b) by 430 days.

(21) Appl. No.: 12/463,770

(22) Filed: May 11, 2009

Related U.S. Application Data

(63) Continuation-in-part of application No. 11/692,764, filed on Mar. 28, 2007, now Pat. No. 7,657,384.

(51) Int. Cl.
*G01L 7/00* (2006.01)

(52) U.S. Cl.
USPC .............................. 702/51; 702/184

(58) Field of Classification Search
USPC .............................. 702/24, 51, 187, 188, 184
See application file for complete search history.

(56) References Cited

U.S. PATENT DOCUMENTS

| | | | |
|---|---|---|---|
| 3,853,455 A | 12/1974 | Riordan et al. | |
| 3,976,450 A | 8/1976 | Marcote et al. | |
| 3,985,509 A | 10/1976 | Trone et al. | |
| 4,182,740 A | 1/1980 | Hartmann et al. | |
| 4,316,381 A | 2/1982 | Woodruff | |
| 4,346,055 A | 8/1982 | Murphy et al. | |
| 4,603,235 A | 7/1986 | Crabbe, Jr. | |
| H572 H | 2/1989 | Hansen | |
| 5,099,437 A | 3/1992 | Weber | |
| 5,206,818 A | 4/1993 | Speranza | |
| 5,356,594 A * | 10/1994 | Neel et al. | 422/54 |
| 5,432,095 A | 7/1995 | Forsberg | |
| 5,479,359 A * | 12/1995 | Rogero et al. | 702/24 |
| 5,485,620 A | 1/1996 | Sadre et al. | |
| 5,563,335 A | 10/1996 | Howard | |
| 5,655,900 A | 8/1997 | Cacciatore | |
| 5,752,007 A | 5/1998 | Morrison | |
| 5,899,683 A | 5/1999 | Nolte et al. | |
| 6,042,634 A | 3/2000 | Van Tassel et al. | |
| 6,252,510 B1 | 6/2001 | Dungan | |
| 6,341,287 B1 | 1/2002 | Sziklai et al. | |
| 6,345,234 B1 | 2/2002 | Dilger et al. | |
| 6,438,535 B1 | 8/2002 | Benjamin et al. | |
| 6,478,849 B1 | 11/2002 | Taylor et al. | |

(Continued)

FOREIGN PATENT DOCUMENTS

| | | |
|---|---|---|
| EP | 0378674 A1 | 7/1990 |
| EP | 1329725 A1 | 7/2003 |
| WO | 2006-022648 A1 | 3/2006 |

OTHER PUBLICATIONS

Office Action (Aug. 4, 2009); U.S. Appl. No. 12/032,499 (Moses, et al).

(Continued)

*Primary Examiner* — Mischita Henson
(74) *Attorney, Agent, or Firm* — Pramudji Law Group PLLC; Ari Pramudji

(57) ABSTRACT

A method for verifying whether a technician is accurately monitoring one or more Leak Detection And Repair (LDAR) components. The method includes receiving a request to display an assignment. The assignment lists one or more LDAR components to be monitored in one or more areas. The assignment also lists one or more artificial LDAR components that do not exist in the areas. After receiving the request to display the assignment, the method includes displaying the assignment and receiving information regarding one of the artificial LDAR components.

21 Claims, 6 Drawing Sheets

(56) References Cited

U.S. PATENT DOCUMENTS

| | | | |
|---|---|---|---|
| 6,497,136 B2 | 12/2002 | Satou | |
| 6,545,278 B1 | 4/2003 | Mottier et al. | |
| 6,549,916 B1 | 4/2003 | Sedlar | |
| 6,609,090 B1 | 8/2003 | Hickman et al. | |
| 6,672,129 B1 | 1/2004 | Frederickson et al. | |
| 6,680,778 B2 | 1/2004 | Hinnrichs et al. | |
| 6,722,185 B2 | 4/2004 | Lawson et al. | |
| 6,771,744 B1 | 8/2004 | Smith et al. | |
| 7,017,386 B2 | 3/2006 | Liu et al. | |
| 7,089,530 B1 | 8/2006 | Dardinski et al. | |
| 7,103,610 B2 | 9/2006 | Johnson et al. | |
| 7,136,904 B2 | 11/2006 | Bartek et al. | |
| 7,298,279 B1 | 11/2007 | Badon et al. | |
| 7,330,768 B2 | 2/2008 | Scott et al. | |
| 7,356,703 B2 | 4/2008 | Chebolu et al. | |
| 7,369,945 B2 | 5/2008 | Miller et al. | |
| 7,437,362 B1 | 10/2008 | Ben-Natan | |
| 7,568,909 B2 | 8/2009 | MacNutt et al. | |
| 7,588,726 B1* | 9/2009 | Mouradian et al. | 422/83 |
| 7,657,384 B1 | 2/2010 | Moses | |
| 7,840,366 B1 | 11/2010 | Moses et al. | |
| 7,851,758 B1 | 12/2010 | Scanlon et al. | |
| 7,908,118 B2* | 3/2011 | Trowbridge et al. | 702/182 |
| 8,034,290 B1 | 10/2011 | Skiba et al. | |
| 2002/0026339 A1 | 2/2002 | Frankland et al. | |
| 2002/0059463 A1 | 5/2002 | Goldstein | |
| 2002/0080032 A1 | 6/2002 | Smith et al. | |
| 2002/0092974 A1 | 7/2002 | Kouznetsov | |
| 2002/0094498 A1 | 7/2002 | Rodriguez-Rodriguez et al. | |
| 2002/0178789 A1 | 12/2002 | Sunshine et al. | |
| 2003/0012696 A1 | 1/2003 | Millancourt | |
| 2003/0081214 A1 | 5/2003 | Mestha et al. | |
| 2003/0085714 A1 | 5/2003 | Keyes et al. | |
| 2003/0217101 A1 | 11/2003 | Sinn | |
| 2004/0005715 A1 | 1/2004 | Schabron et al. | |
| 2004/0011421 A1 | 1/2004 | Bartlett et al. | |
| 2004/0059539 A1 | 3/2004 | Otsuki et al. | |
| 2004/0177032 A1 | 9/2004 | Bradley et al. | |
| 2004/0204915 A1 | 10/2004 | Steinthal et al. | |
| 2004/0226345 A1* | 11/2004 | McCoy et al. | 73/40.7 |
| 2004/0258213 A1 | 12/2004 | Beamon et al. | |
| 2005/0000981 A1 | 1/2005 | Peng et al. | |
| 2005/0005167 A1 | 1/2005 | Kelly et al. | |
| 2005/0053104 A1 | 3/2005 | Kulp et al. | |
| 2005/0060392 A1 | 3/2005 | Goring et al. | |
| 2005/0117641 A1 | 6/2005 | Xu et al. | |
| 2005/0181245 A1 | 8/2005 | Bonne et al. | |
| 2005/0234934 A1 | 10/2005 | Mackay et al. | |
| 2005/0243765 A1 | 11/2005 | Schrader et al. | |
| 2005/0246112 A1 | 11/2005 | Abhulimen et al. | |
| 2005/0262995 A1 | 12/2005 | Kilkis | |
| 2005/0267642 A1* | 12/2005 | Whiffen et al. | 700/286 |
| 2005/0275556 A1 | 12/2005 | Brown | |
| 2005/0286927 A1 | 12/2005 | Brenner | |
| 2006/0020186 A1 | 1/2006 | Brister et al. | |
| 2006/0220888 A1 | 10/2006 | Germouni et al. | |
| 2006/0235611 A1 | 10/2006 | Deaton et al. | |
| 2006/0246592 A1 | 11/2006 | Hashmonay | |
| 2006/0286495 A1 | 12/2006 | Roussel | |
| 2006/0286945 A1 | 12/2006 | Reznik et al. | |
| 2007/0000310 A1 | 1/2007 | Yamartino et al. | |
| 2007/0004381 A1 | 1/2007 | Larson et al. | |
| 2007/0136190 A1 | 6/2007 | Engle | |
| 2007/0139183 A1 | 6/2007 | Kates | |
| 2007/0299953 A1 | 12/2007 | Walker et al. | |
| 2008/0021717 A1 | 1/2008 | Kaartinen et al. | |
| 2008/0063298 A1 | 3/2008 | Zhou et al. | |
| 2008/0092625 A1 | 4/2008 | Hinnrichs | |
| 2008/0120043 A1 | 5/2008 | Miller et al. | |
| 2008/0229805 A1 | 9/2008 | Barket et al. | |
| 2008/0231719 A1 | 9/2008 | Benson et al. | |
| 2009/0315669 A1 | 12/2009 | Lang et al. | |
| 2010/0211333 A1* | 8/2010 | Pruet et al. | 702/51 |

OTHER PUBLICATIONS

Response to Office Action (Mar. 21, 2011), Office Action (Dec. 21, 2010), RCE (Sep. 27, 2010), Advisory Action (Sep. 10, 2010); U.S. Appl. No. 11/668,367 (Skiba, et al).

Response After Final (May 23, 2011), Final Office Action (Mar. 22, 2011), Response to Office Action (Dec. 27, 2010); U.S. Appl. No. 12/133,920 (Moses, et al).

"Bluetooth Tutorial—Specifications"; Palo Wireless: Bluetooth Resource Center [online]; Jan. 5, 2006; retrieved Dec. 23, 2009 via Internet Archive Wayback Machine.

USPTO Allowance (Jun. 8, 2011); U.S. Appl. No. 11/668,367 (Skiba, et al).

RCE Amendment (Jun. 22, 2011) and USPTO Advisory Action (Jun. 7, 2011); U.S. Appl. No. 12/133,920 (Moses, et al).

Response to Office Action (Aug. 29, 2011), USPTO Office Action (May 27, 2011); U.S. Appl. No. 12/474,504 (Bolinger, et al).

*Environmental Analytics, Inc.* v. *TMX2, Inc.* and *LDAR Solutions, Ltd.*; Case 4:08-cv-03353; USDC, Southern District of Texas; First Amended Complaint; Dec. 10, 2008.

"2nd Annual Fugitive Emissions—Leak Detection and Repair Symposium"; ISA Technical Conference Brochure; Nov. 2002.

"Introducing the Allegro CX(TM) Field Computer"; Product Newswire (product announcement); Jun. 21, 2004.

"New from Accutech, Wireless Acoustic Monitor Field Units Make Fugitive Emissions Monitoring Compliance Easy"; Product Announcement/Description; Feb. 10, 2004.

"LDARM™ Makes Fugitive Emission Monitoring A Breeze TISCOR launches its newest product for Leak Detection and Repair"; product announcement/description; Nov. 8, 2002.

Response/Amendment After Final (Aug. 24, 2010); Final Office Action (Jun. 25, 2010); Response to Office Action (Apr. 26, 2010); and Office Action (Jan. 25, 2010); U.S. Appl. No. 11/668,367 (Skiba, et al).

Response to Office Action (Jul. 13, 2010); Office Action (Apr. 14, 2010); Response/Amendment After Final (Mar. 29, 2010); Final Office Action (Jan. 29, 2010); Response to Office Action (Nov. 4, 2009); and Office Action (Aug. 4, 2009); U.S. Appl. No. 12/032,499 (Moses, et al).

Office Action (Sep. 27, 2010); U.S. Appl. No. 12/133,920 (Moses, et al).

Response to Office Action (Feb. 21, 2010) and USPTO Office Action (Nov. 18, 2011); U.S. Appl. No. 12/359,196 (Moses, et al.).

Response to Office Action (Feb. 22, 2012) and USPTO Office Action (Nov. 22, 2011); U.S. Appl. No. 12/463,770 (Moses).

USPTO Notice of Allowance (May 3, 2012); U.S. Appl. No. 12/474,504 (Bolinger et al.).

USPTO Office Action (Mar. 6, 2013)—U.S. Appl. No. 12/463,770 (Moses, et al.).

USPTO Final Action (Jul. 12, 2012) and Response to Office Action (Apr. 24, 2012); U.S. Appl. No. 12/814,265 (Moses).

USPTO Office Action (Jan. 24, 2012)—U.S. Appl. No. 12/814,265 (Moses).

Sylvers, Eric ; Wireless: The story of 'Wi'-Technology—International Herald Tribune; Apr. 2006; http://www.nytimes.com/2006/04/17/technology/17iht-wireless18.1550306.html?pagewanted=print (retrieved May 17, 2011).

USPTO Office Action (Nov. 22, 2011); U.S. Appl. No. 12/463,770 (Moses).

RCE Amendment (Jun. 22, 2011) and USPTO Advisory Action (Jun. 7, 2011); U.S. Appl. No. 12/133,920 (Moses et al).

* cited by examiner

MANAGEMENT OF RESPONSE TO TRIGGERING EVENTS IN CONNECTION WITH MONITORING FUGITIVE EMISSIONS

This application is a continuation-in-part of U.S. patent application Ser. No. 11/692,764, filed Mar. 28, 2007, and now U.S. Pat. No. 7,657,384. The aforementioned related patent application is incorporated herein by reference.

BACKGROUND

1. Field of the Invention

Implementations of various technologies described herein generally relate to monitoring fugitive emissions and management of response to triggering events in connection with monitoring fugitive emissions.

2. Description of the Related Art

The following descriptions and examples do not constitute an admission as prior art by virtue of their inclusion within this section.

Industrial plants that handle volatile organic compounds (VOCs) sometimes experience unwanted emissions of those compounds into the atmosphere from point sources, such as smokestacks, and non-point sources, such as valves, pumps, and/or vessels containing the VOCs. Emissions from non-point sources typically occur due to leakage of the VOCs from joints and/or seals and may be referred to herein as "fugitive emissions". Fugitive emissions from control valves typically occur as leakage through the packing set around the valve stem. Control valves used in demanding service conditions involving large temperature fluctuations and frequent movements of the valve stem commonly suffer accelerated deterioration of the valve stem packing set.

The United States Environmental Protection Agency (EPA) has promulgated regulations specifying maximum permitted leakage of certain hazardous air pollutants, such as benzene, toluene, 1,1,1-trichloroethane, from certain components, e.g., control valves, pump seals, compressor agitators, valves, pipe connectors and the like. As such, the regulations require facility operators to perform periodic surveys of the emissions from these components. The survey interval frequency may be monthly, quarterly, semiannual, or annual. If the facility operator can document that a certain percentage of the components with excessive leakage are below a prescribed minimum, the required surveys become less frequent. Thus, achieving a low percentage of leaking valves reduces the number of surveys required per year, which may result in large cost savings.

In addition to conducting the surveys, facility operators may be required to comply with an array of regulatory, safety and commercial parameters. For example, facility operators may be required to repair identified leaks on the components and generate reports with proper codes in compliance regulatory, safety and commercial parameters. As another example, facility operators may be required to maintain proper calibration on the toxic vapor analyzers used to monitor the leakage. Most, if not all, of the surveys and compliance are typically performed manually by technicians. Unfortunately, due to the wide array of compliance parameters, some of these parameters are often not met.

SUMMARY

Implementations of various technologies described herein are directed to a method for managing a response to a triggering event in connection with a fugitive emissions monitor of a component.

In one implementation, a computer application may be used to verify whether a technician is accurately monitoring one or more Leak Detection And Repair (LDAR) components. In order to verify whether the technician is accurately monitoring the LDAR components, the computer application may first receive a request from the technician to display an assignment. The assignment may list one or more LDAR components to be monitored in one or more areas. The assignment may also list one or more artificial LDAR components that do not exist in the areas. After receiving the request to display the assignment, the computer application may display the assignment, and it may then receive information regarding one of the artificial LDAR components.

In another implementation, the computer application may receive a request from a technician to display an assignment for monitoring one or more actual LDAR components that exist in one or more areas. Upon receiving the request, the computer application may add one or more artificial LDAR components to the assignment. The computer application may then display the assignment which may include the actual LDAR components and the artificial LDAR components. After displaying the assignment, the computer application may receive information regarding at least one of the artificial LDAR components from the technician.

In another implementation, the computer application may receive a request from the technician to display an assignment for monitoring one or more actual LDAR components that exist in one or more areas. Upon receiving the request, the computer application may display the assignment to the technician. While the computer program is displaying the assignment, it may modify the assignment to include one or more artificial LDAR components that do not exist in the areas. The computer application may then receive information pertaining to one of the artificial LDAR components.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Figure 1:
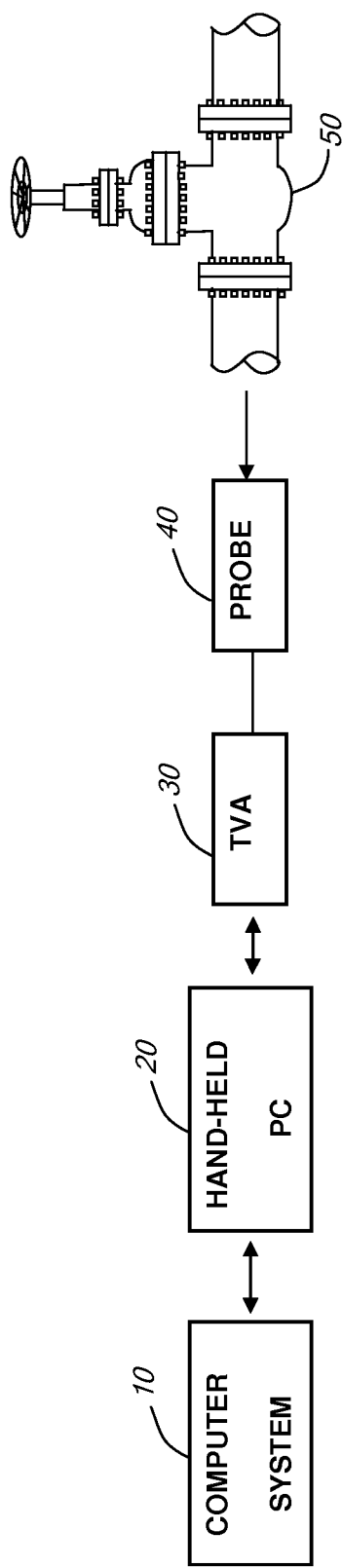
FIG. 1 illustrates a schematic diagram of an environment in which various technologies and techniques described herein may be implemented.

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs generally describe one or more implementations of various techniques directed to managing a response to a triggering event in connection with a fugitive emissions monitor. In one implementation, a user, such as a technician, may use a probe to obtain an air sample from a component. The air sample may be transferred to a toxic vapor analyzer, which may then analyze, determine a parts per million (PPM) level corresponding to the air sample, convert the PPM level to a binary signal and send the signal to a handheld personal computer (PC), which contains a triggering event monitoring program. The triggering event monitoring program may then determine whether the binary signal qualifies as a triggering event. If it does, then the event monitoring program will display a message on the handheld PC indicating the triggering event and the steps that need to be taken to remedy the triggering event.

In another implementation, the technician may receive an assignment that lists one or more components in which the technician is assigned to monitor. In one implementation, one or more artificial components may be added to the technician's assignment. The artificial components are fictitious components that do not actually exist. As such, the triggering event monitoring program may use the artificial components to determine whether a particular technician is properly monitoring the assigned components. For instance, if a technician monitors any of the artificial components, the triggering event monitoring program may display a message to the technician to stop monitoring the components and to report to his supervisor. However, if the technician indicates to the triggering event monitoring program that the artificial components do not exist, then the triggering event monitoring program may display a message to the technician commending him for his diligent work. In one implementation, the message may be displayed after the technician monitors all of the components listed in the assignment. In another implementation, the triggering event monitoring program may generate a report detailing the results of the technician's inputs while the technician monitors the components listed in his assignment. Here, the report may be displayed to the technician's supervisor after the technician monitors all of the components listed in his assignment. The report may be presented at this time to prevent the technician from knowing which component is an artificial component and to prevent the technician from destroying a record of him monitoring the artificial component. In one implementation, the report may also be accessed by the technician's supervisor at any time by entering a password into the triggering event monitoring program.

The various technologies and techniques for managing a response to a triggering event in connection with a fugitive emissions monitor in accordance with various implementations are described in more detail with reference to FIGS. 1-7 in the following paragraphs.

FIG. 1 illustrates an environment 100 in which various technologies and techniques described herein may be implemented. The environment 100 includes a computer system 10 that may include various applications and/or programs for managing and storing information pertaining to fugitive emissions detection. The computer system 10 will be described in more detail with reference to FIG. 2. The computer system 10 may be in communication with a handheld personal computer (PC) 20, which may commonly be referred to as a personal digital assistant (PDA). The handheld PC 20 will be described in more detail with reference to FIG. 3. In one implementation, the computer system 10 may be in communication with the handheld PC 20 through a wireless network, which may include Bluetooth technology, Spread Spectrum, Broadband, Wi-Fi and the like.

The handheld PC 20 may be in communication with a toxic vapor analyzer 30, which may be configured to detect volatile organic chemicals, emissions gases, nitroaromatics, chemical warfare agents and the like. In one implementation, the toxic vapor analyzer 30 is TVA-1000 available from The Foxboro Company out of Massachusetts, USA or Phx21 available from Environmental Analytics Inc out of Texas, USA. However, it should be understood that some implementations may use other types of toxic vapor analyzers. The toxic vapor analyzer 30 may include a probe 40 for receiving an air sample from a component 50, such as control valves, pump seals and the like. The toxic vapor analyzer 30 may be in communication with the handheld PC 20 through a wireless network, which may include Bluetooth technology, Spread Spectrum, Broadband, Wi-Fi and the like.

Figure 2:
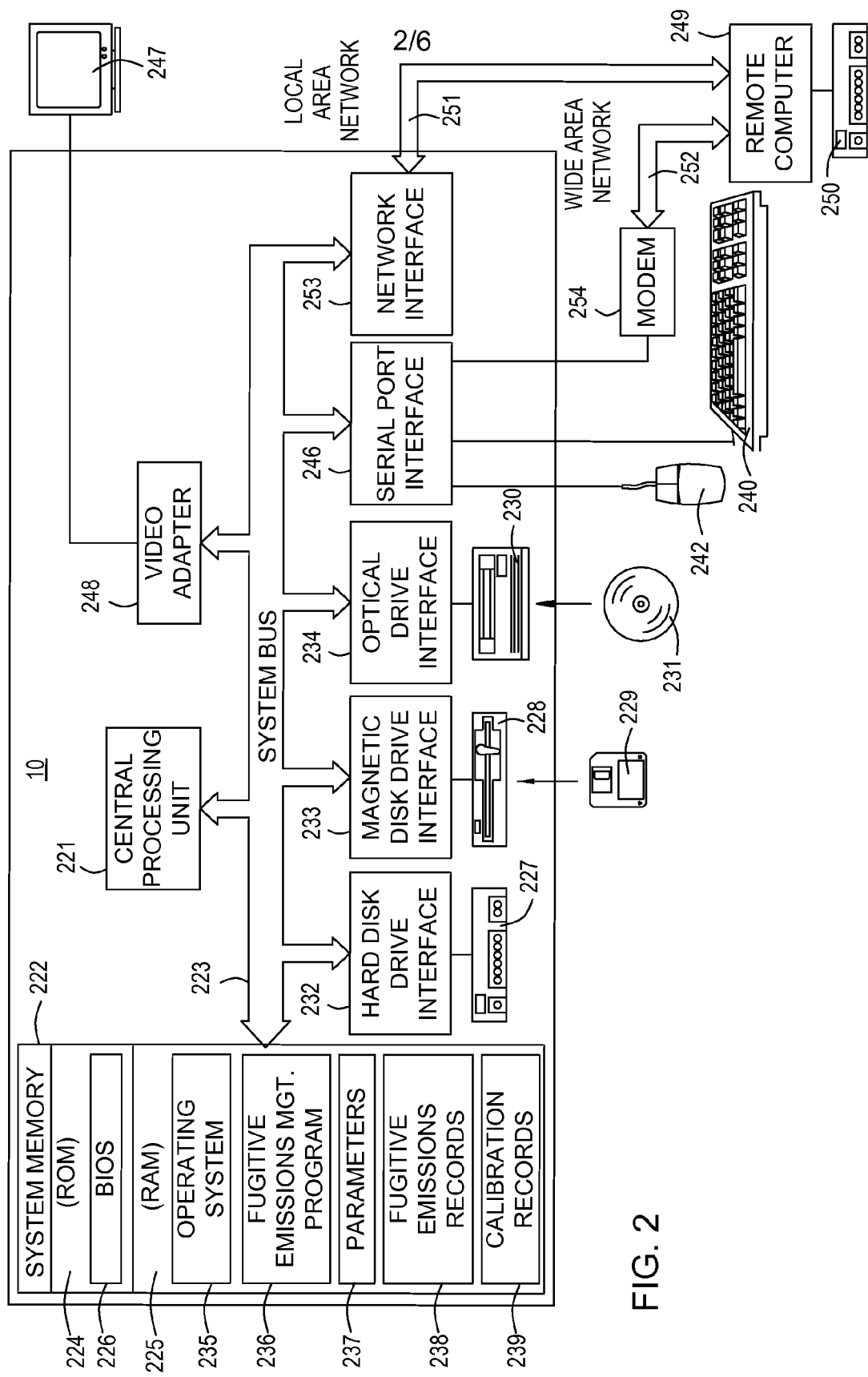
FIG. 2 illustrates a schematic diagram of a computer system that may be used in connection with implementations of various technologies described herein.
Figure 3:
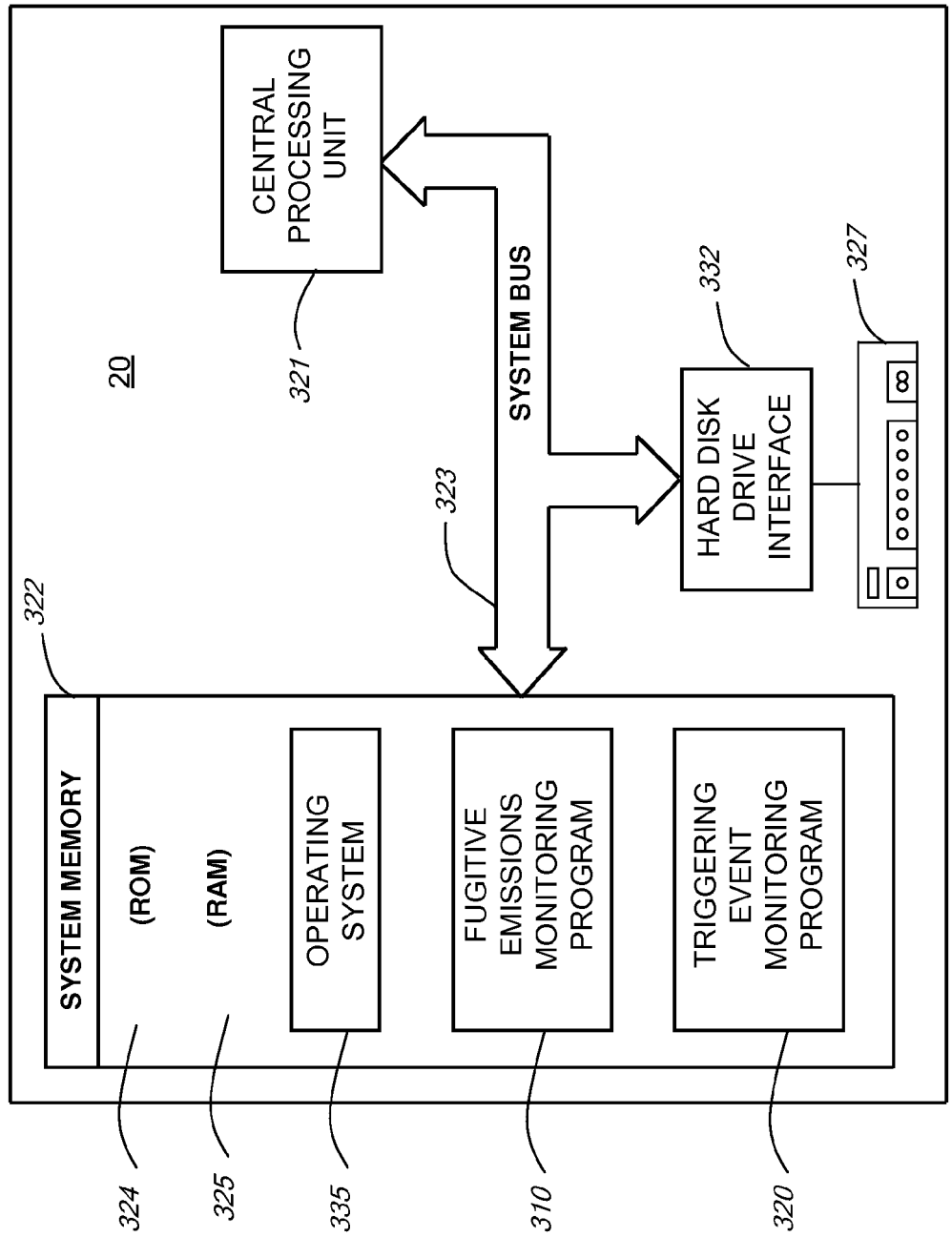
FIG. 3 illustrates a schematic diagram of a handheld PC in which various technologies and techniques described herein may be implemented.

FIG. 2 illustrates the computer system 10 in more detail in accordance to implementations of various technologies described herein. The computer system 10 may include a central processing unit (CPU) 221, a system memory 222 and a system bus 223 that couples various system components including the system memory 222 to the CPU 221. Although only one CPU is illustrated in FIG. 2, it should be understood that in some implementations the computer system 10 may include more than one CPU. The system bus 223 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 222 may include a read only memory (ROM) 224 and a random access memory (RAM) 225. A basic input/output system (BIOS) 226, containing the basic routines that help transfer information between elements within the computer system 10, such as during start-up, may be stored in the ROM 224.

The computer system 10 may further include a hard disk drive 227 for reading from and writing to a hard disk, a magnetic disk drive 228 for reading from and writing to a removable magnetic disk 229, and an optical disk drive 230 for reading from and writing to a removable optical disk 231, such as a CD ROM or other optical media. The hard disk drive 227, the magnetic disk drive 28, and the optical disk drive 230 may be connected to the system bus 223 by a hard disk drive interface 232, a magnetic disk drive interface 233, and an optical drive interface 234, respectively. The drives and their associated computer-readable media may provide nonvolatile storage of computer-readable instructions, data structures, program modules and other data for the computer system 10.

Although the computer system 10 is described herein as having a hard disk, a removable magnetic disk 229 and a removable optical disk 231, it should be appreciated by those skilled in the art that the computing system 100 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system 10. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored on the hard disk, magnetic disk 229, optical disk 231, ROM 224 or RAM 225, including an operating system 235, a fugitive emissions management program 236, fugitive emissions parameters 237, fugitive emissions recordings 238 and calibration records 239. The operating system 35 may be any suitable operating system that may control the operation of a networked personal or server computer, such as Windows® XP, Mac OS® X, Unix-variants (e.g., Linux® and BSD®), and the like. The fugitive emissions management program 236 may be configured to manage the fugitive emissions parameters 237, the fugitive emissions recordings 238 and the calibration records 239. The fugitive emissions parameters 237 may be based on client specifications, safety hazards parameters, risk management parameters and regulatory/compliance protocols. The calibration records 239 may include calibration records for toxic vapor analyzers.

A user may enter commands and information into the computer system 10 through input devices such as a keyboard 240 and pointing device 242. The input devices may be connected to the CPU 221 through a serial port interface 246 coupled to system bus 223, but may be connected by other interfaces, such as a parallel port, game port or a universal serial bus (USB). A monitor 247 or other type of display device may also be connected to system bus 223 via an interface, such as a video adapter 248.

Further, the computer system 10 may operate in a networked environment using logical connections to one or more remote computers, such as a remote computer 249. Although the remote computer 249 is illustrated as having only a memory storage device 250, the remote computer 249 may include many or all of the elements described above relative to the computer system 10. The logical connections may be any connection that is commonplace in offices, enterprise-wide computer networks, intranets, and the Internet, such as local area network (LAN) 251 and a wide area network (WAN) 252.

When using a LAN networking environment, the computer system 10 may be connected to the local network 251 through a network interface or adapter 253. When used in a WAN networking environment, the computer system 10 may include a modem 254, wireless router or other means for establishing communication over a wide area network 252, such as the Internet. The modem 254, which may be internal or external, may be connected to the system bus 223 via the serial port interface 246. In a networked environment, program modules depicted relative to the computer system 10, or portions thereof, may be stored in a remote memory storage device 250. It will be appreciated that the network connections shown are exemplary and other means of establishing a communications link between the computers may be used.

The remote computer 249 may be another personal computer, a server, a router, a network PC, a peer device or other common network node. In one implementation, the remote computer 249 may be the handheld PC 20 described with reference to FIG. 1. As such, the handheld PC 20 may include many or all of the elements described above relative to the computer system 10. For example, in FIG. 3, the handheld PC 20 is illustrated as having a CPU 321, a system memory 322 and a system bus 323 that couples various system components to the CPU 321. The system memory 322 may include a read only memory (ROM) 324 and a random access memory (RAM) 325. The handheld PC 20 may further include a hard disk drive 327 for reading from and writing to a hard disk. The hard disk drive 327 may be connected to the system bus 323 by a hard disk drive interface 332. One difference between the computer system 10 and the handheld PC 20 is the various programs stored in memory. For example, the handheld PC 20 may include a fugitive emissions monitoring program 310 and a triggering event monitoring program 320. The fugitive emissions monitoring program 310 may be configured to identify the various components to be tested and accept readings from the toxic vapor analyzer 30. The triggering event monitoring program 320 may be configured to manage responses to triggering events. The operation of the fugitive emissions monitoring program 310 and a triggering event monitoring program 320 will be described in more detail in the following paragraphs with reference to FIG. 4.

Figure 4:
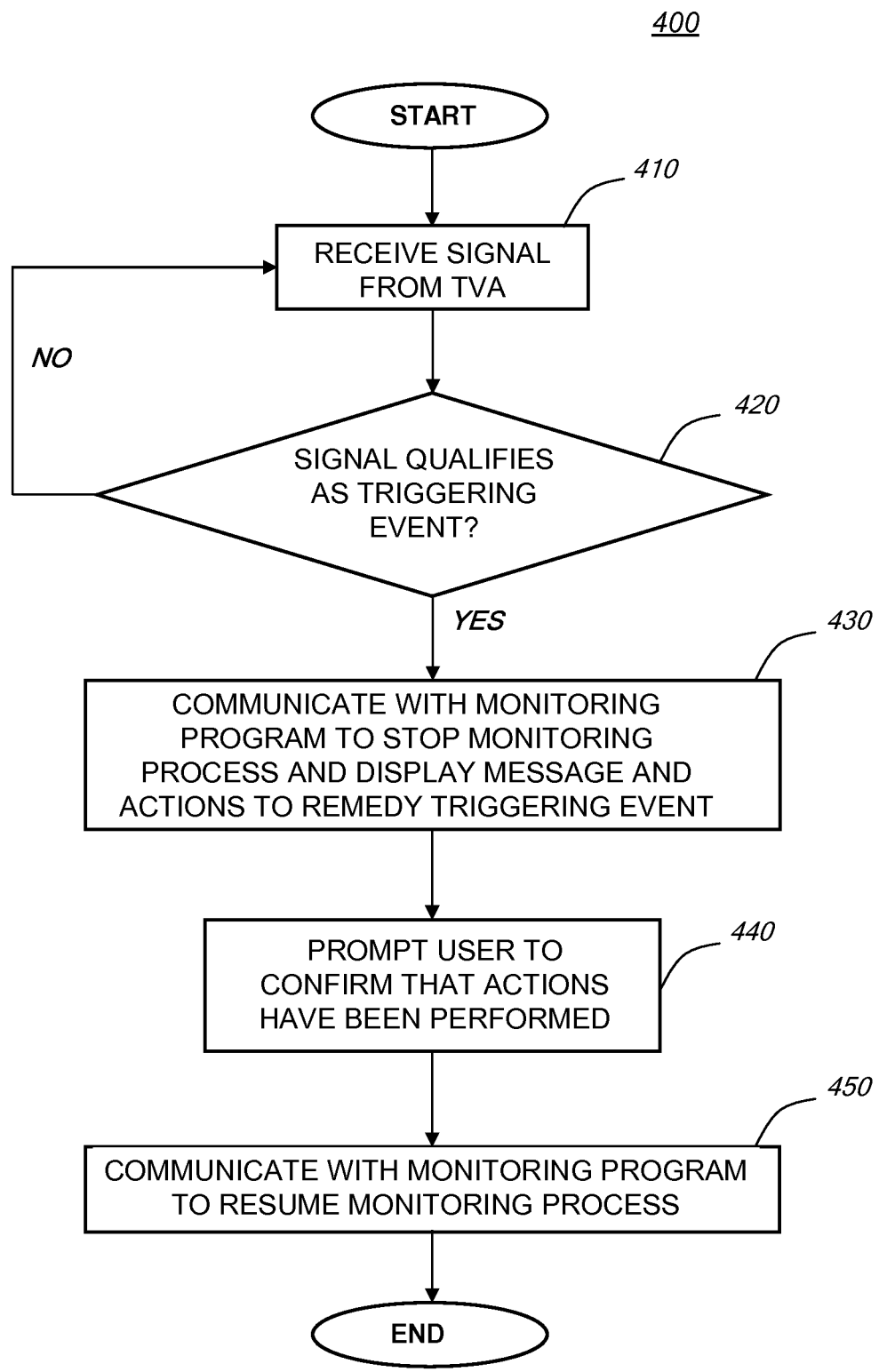
FIG. 4 illustrates a flow diagram of a method for managing a response to a triggering event in connection with a fugitive emissions monitor in accordance with implementations of various technologies and techniques described herein.

FIG. 4 illustrates a flow diagram of a method 400 for managing a response to a triggering event in connection with a fugitive emissions monitor in accordance with implementations of various technologies and techniques described herein. It should be understood that while the flow diagram indicates a particular order of execution of the operations, in some implementations, the operations might be executed in a different order. In one implementation, the method 400 may be performed by the triggering event monitoring program 320.

At step 410, a signal may be received by the handheld PC 20 from the toxic vapor analyzer 30. The signal may be generated by the toxic vapor analyzer 30 in response to receiving an air sample collected by the probe 40. Further, the signal may be transmitted wirelessly from the toxic vapor analyzer 30 to the handheld PC 20. The air sample may be collected from a leak interface on a component, such as a control valve, pump seal and the like. In one implementation, upon receipt of the air sample, the toxic vapor analyzer 30 may analyze the air sample, determine a parts per million (PPM) level for the air sample, convert the PPM level to a binary signal and send the binary signal to the triggering event monitoring program 320. The triggering event monitoring program 320 may then forward the binary signal to the fugitive emissions monitoring program 310.

At step 420, a determination is made as to whether the received signal qualifies as a triggering event. If the signal is determined as a triggering event, then the monitoring process is stopped and a message with a set of actions to remedy the triggering event may be displayed (step 430). In one implementation, the triggering event monitoring program 320 may communicate with the fugitive emissions monitoring program 310 to halt the monitoring process. At step 440, the triggering event monitoring program 320 may prompt a user, such as a technician, to confirm that the actions displayed in the previous step have been performed. At step 450, the monitoring process may be resumed. The triggering event monitoring program 320 may communicate with the fugitive emissions monitoring program 310 to resume the monitoring process.

In one implementation, if the received binary signal does not qualify as a triggering event, then the triggering event monitoring program 320 forwards the binary signal to the fugitive emissions monitoring program 310, which records the date, time and the corresponding PPM reading of the binary signal. On the other hand, if the received binary signal qualifies as a triggering event, then the triggering event monitoring program 320 forwards the actions that have been performed to remedy the triggering event to the fugitive emissions monitoring program 310 along with the binary signal.

The following table illustrates a number of triggering events, messages corresponding to those triggering events and a set of actions to remedy those triggering events.

| Triggering Event | Message | Actions |
| --- | --- | --- |
| PPM level corresponding to signal exceeds a predetermined PPM level, e.g., 500 PPM | Leak! Report leak | Specific steps based on client location and specifications |
| No signal from toxic vapor analyzer | toxic vapor analyzer malfunction | Look for flame out, dead battery of toxic vapor analyzer, $H_2$ refill |
| Background PPM level exceeds a predetermined value | Background PPM level exceeds maximum value | Notify client/supervisor and obtain signature |
| Exceeds a predetermined PPM level, e.g., 10,000 PPM, for HRVOC | Leak! Report leak | Notify client/supervisor and obtain signature |
| PPM level of a predetermined number of components is below a predetermined value | Notify client/supervisor | Notify client/supervisor and obtain signature |
| A number of components in an area of a facility have exceeded a predetermined PPM level | Leaks! Report to client/supervisor | Stop monitoring Report to client/supervisor |

Figure 5:
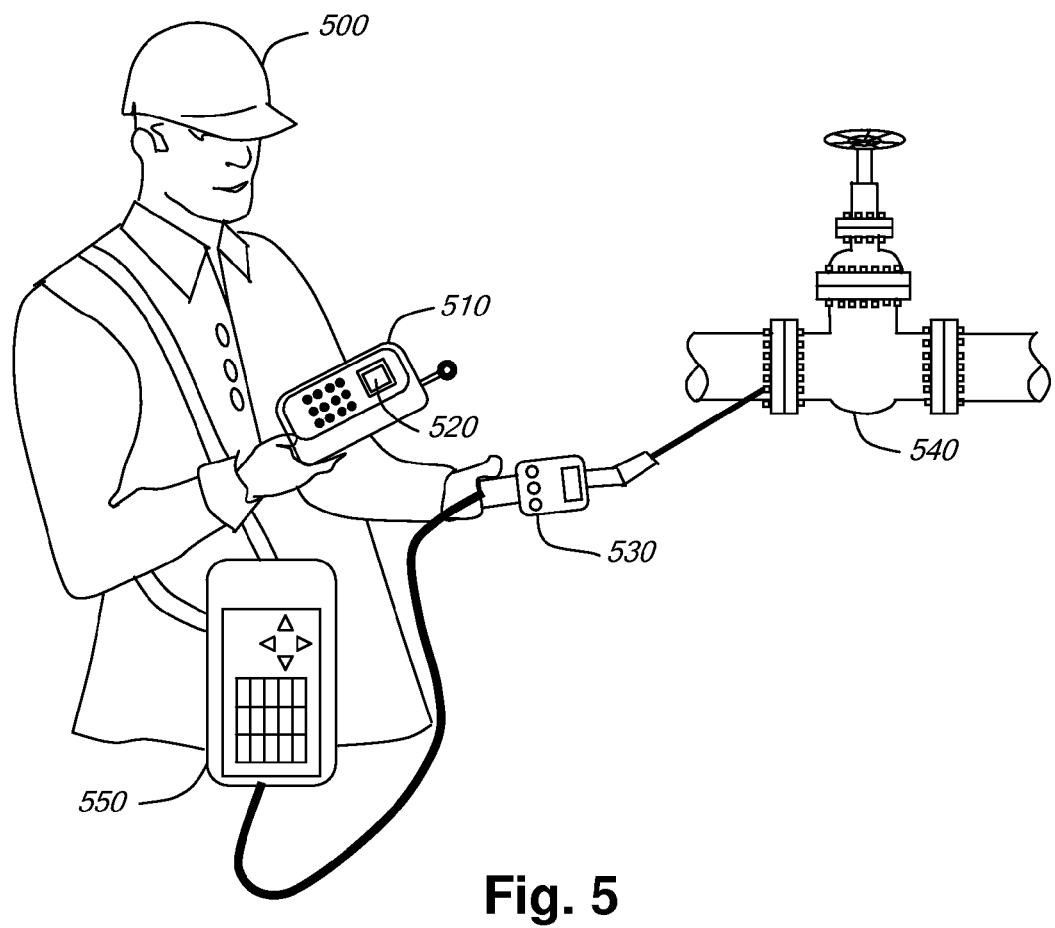
FIG. 5 illustrates a schematic diagram of a technician using a handheld PC having the triggering event monitoring program that operates in accordance with one implementation described with reference to FIG. 4.

FIG. 5 illustrates a schematic diagram of a technician 500 using a handheld PC 510 having the triggering event monitoring program 520 that operates in a manner described with reference to FIG. 4. The technician 500 may use a probe 530 to obtain an air sample from a component 540. The air sample may then be transferred to a toxic vapor analyzer 550 attached to the back of the technician 500. The toxic vapor analyzer 550 may then analyze the air sample, determine a parts per million (PPM) level for the air sample, convert the PPM level to a binary signal and send the binary signal to the handheld PC 510. The binary signal may then be processed according to the steps described with reference to FIG. 4.

In one implementation, referring back to step 410, the triggering event monitoring program 320 may receive a manual input from the technician, rather than a signal from the toxic vapor analyzer 30. The manual input may be based on an observation by the technician. Examples of such observation include audio visual olfactory (AVO) detection, open-ended line (OEL) detection, leaker tag, an alarm and the like. For such examples, the actions to remedy the triggering events may include requiring some input regarding the type and location of the observation, sending a notification to the client/supervisor and obtaining a signature.

Figure 6:
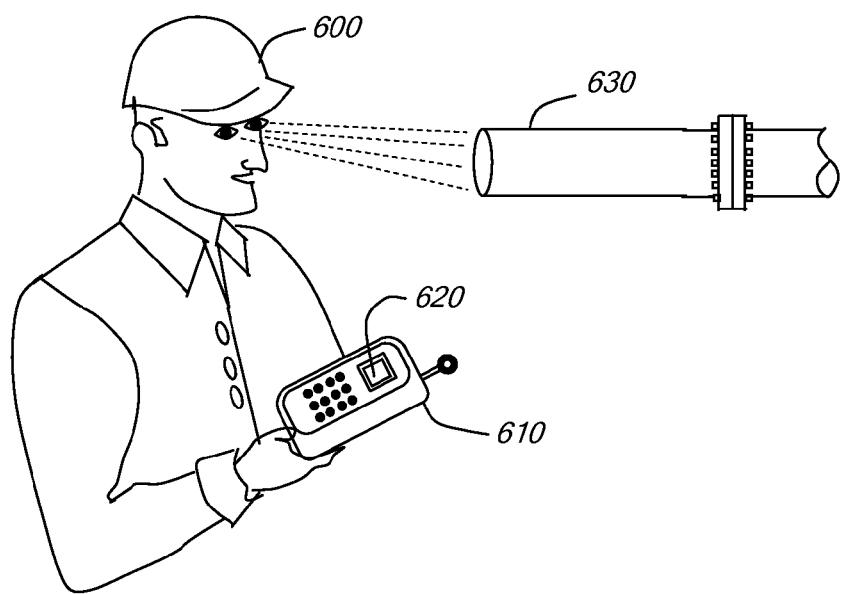
FIG. 6 illustrates a schematic diagram of a technician using a handheld PC having the triggering event monitoring program that operates in accordance with another implementation described with reference to FIG. 4.

FIG. 6 illustrates a schematic diagram of a technician 600 using a handheld PC 610 having the triggering event monitoring program 620 that operates in a manner described with reference to FIG. 4 and the above paragraph. The technician 600 may manually enter an input into the handheld PC 610 in response to his observation of the environment surrounding a component 630. In response to receiving the input, the triggering event monitoring program 620 may determine whether the input qualifies as a triggering event. If the input is a triggering event, then the triggering event monitoring program 620 may display the steps to be taken to remedy the triggering event.

Figure 7:
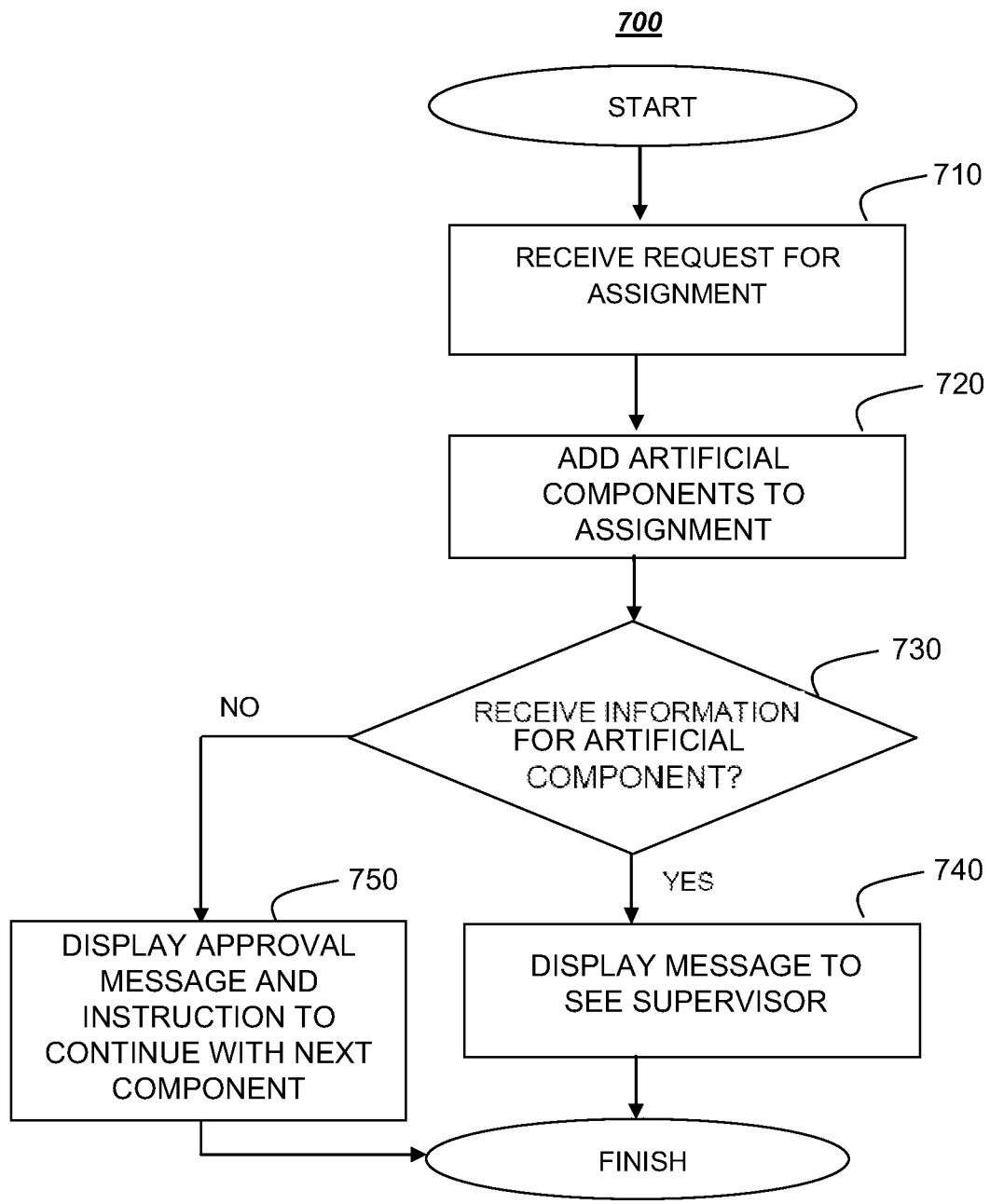
FIG. 7 illustrates a flow diagram of a method for verifying whether a technician is accurately monitoring one or more components listed in the technician's assignment in accordance with various techniques described herein.

In another implementation, referring back to step 420, in lieu of making a determination of a triggering event based on a signal from the toxic vapor analyzer 30, a determination of the triggering event may be made based on the component monitored by the technician. FIG. 7 illustrates a flow diagram of a method for verifying whether a technician is accurately monitoring one or more components listed in the technician's assignment in accordance with various techniques described herein. The following description of method 700 is made with reference to technician 600, the handheld PC 610, the triggering event monitoring program 620, and one or more components 630 of FIG. 6 in accordance with one or more implementations of various techniques described herein. Additionally, it should be understood that while the operational flow diagram indicates a particular order of execution of the operations, in some implementations, certain portions of the operations might be executed in a different order.

In one implementation, the technician 600 may be assigned to monitor the components 630 in an area that may include all or part of an industrial plant. Within the area, there may be one or more major equipments. Examples of major equipments include pumps, compressors, exchangers, tanks and vessels. The major equipment may contain one or more components 630 located on the equipment itself. The components 630 may include valves, pumps, compressors, connectors, flanges, and other devices that can be found on the major equipment at industrial plants. In one implementation, the handheld PC 610 may be used by the technician 600 to record information pertaining to the components 630. The components 630 may include Leak Detection and Repair (LDAR) components.

At step 710, the triggering event monitoring program 620 may receive a request from the technician 600 using the handheld PC 610 to download an assignment for that particular day. The assignment may list the components 630 that the technician 600 may be assigned to monitor for that day. In one implementation, the assignment may be stored on a database that may be accessed by the handheld PC 610.

At step 720, the triggering event monitoring program 620 may add one or more artificial components into the assignment. The artificial components may be represented by identifications or names for components in the assignment, but the identifications or names do not correspond to actual components 630 that exist in an area. These artificial components may be used to verify whether the technician is accurately monitoring the components 630 listed on the downloaded assignment. In one implementation, the artificial components may be randomly inserted into the technician's assignment prior to when the assignment was downloaded, or they may be inserted into the technician's assignment at random times while the technician is monitoring the components 630.

Upon reaching a component 630, the technician 600 may be required to monitor and record one or more readings or measurements from the component 630. Since the artificial component does not actually exist, the technician 600 should not be able to record a monitoring event for the artificial component. Therefore, at step 730, the triggering event monitoring program 620 may receive either false information for the artificial component, no information for the artificial component, or a notification that the artificial component cannot be located.

If the technician 600 enters information for the artificial component, the triggering event monitoring program 620 may determine that the technician is not properly monitoring the components 630 listed in his assignment because the artificial component does not exist. Upon receiving the information for the artificial component, the triggering event monitoring program 620 may proceed to step 740. At step 740, the triggering event monitoring program 620 may display a message to stop monitoring the components 630 and to report to his supervisor. In one implementation, the triggering event monitoring program 620 may display the message only after the technician 600 monitors all of the components 630 listed in his assignment. In another implementation, the triggering event monitoring program 620 may not display a message to the technician 600 at all. Instead, the triggering event monitoring program 620 may send a message to the technician 600's supervisor after the technician 600 has monitored all of the components 630 listed in his assignment.

Referring back to step 730, if the technician 600 does not enter information for the artificial component, the triggering event monitoring program 620 may proceed to step 750. At step 750, the triggering event monitoring program 620 may display an approval message that may commend the technician 600 for working diligently. The message may also prompt the technician 600 to continue working through his assignment.

Likewise, at step 730, the triggering event monitoring program 620 may receive an input from the technician 600 explaining that he was unable to locate the artificial component. In this case, the triggering event monitoring program 620 may again proceed to step 750 and display a message thanking the technician 600 for working carefully. At step 750, the triggering event monitoring program 620 may display the message to the technician 600 after the technician 600 has monitored all of the components 630 listed in his assignment. In one implementation, the triggering event monitoring program 620 may send a message to the technician 600's supervisor describing the technician 600's diligent work, as opposed to displaying the message to the technician 600.

In one implementation, instead of displaying a message to the technician 600 as described in steps 740 and 750, the triggering event monitoring program 620 may store the results of the technician 600's inputs in a report that may be displayed to the technician 600's supervisor after the technician 600 monitors all of the components 630 listed in his assignment. The report may also be displayed to the technician 600's supervisor at the end of a work day, even if the technician 600 did not monitor all of the components listed in the assignment. The report may be used to prevent the technician 600 from realizing that he has inaccurately monitored the artificial component, and it may also be used to prevent the technician 600 from destroying a record of him monitoring the artificial component.

In another implementation, the results of the technician 600's inputs may be displayed by the triggering event monitoring program 620 upon receiving a password. The password may be known to the supervisor but not the technician 620 such that the supervisor may verify that the technician 600 is accurately monitoring the assigned LDAR components.

In another implementation, referring back to step 420, in lieu of making a determination of a triggering event based on a signal from the toxic vapor analyzer 30, a determination of the triggering event may be made based on time. The following table provides examples of triggering events based on time.

| Triggering Event | Message | Actions |
| --- | --- | --- |
| Monitoring time for a component exceeds a predetermined amount of time | Monitoring time exceeds maximum time | Report excess time |
| Deployment time exceeds a predetermined amount of time | Deployment time exceeds maximum time | Report excess time |
| Allotted time to obtain a work permit exceeds a predetermined amount of time | Time to obtain work permit exceeds maximum time | Report excess time |
| Allotted time for lunch or break exceeds a predetermined amount of time | Lunch or break time exceeds maximum time | Report excess time |

In yet another implementation, the determination of the triggering event may be based on climate, e.g., temperature. For example, a message may be displayed to the user with instructions to avoid a heat stroke or a frost bite. In this implementation, the user may be asked to provide information regarding the climate conditions. The triggering event monitoring program may then display certain steps to be taken to remedy the climate conditions.

In still yet another implementation, the triggering event monitoring program 620 may be configured to determine whether the toxic vapor analyzer 30 has been properly calibrated. As such, at the beginning of each day, the calibration record of the toxic vapor analyzer 30 may be transmitted wirelessly to the handheld PC 20. The triggering event monitoring program 620 may then determine whether the calibration record meets the calibration requirements for that particular toxic vapor analyzer 30. If it is determined that the calibration record does not meet the calibration requirements, then the triggering event monitoring program 620 may display a message indicating to the technician that the toxic vapor analyzer 30 has not been properly calibrated and the steps that need to be taken to properly calibrate the toxic vapor analyzer 30.

In other implementations, the triggering event monitoring program 620 may be configured to confirm a number of factors or events associated with the toxic vapor analyzer 30 or the fugitive emissions monitor. The table below provides a number of possible events that may be determined using the triggering event monitoring program 620.

| Triggering Events | Message | Actions |
| --- | --- | --- |
| Technician selects a toxic vapor analyzer that does not include PID mode if needed for assigned components. | Select toxic vapor analyzer with PID capabilities. | Prevent technician from using selected analyzer |
| Drift assessment for toxic vapor analyzer does not match requirements | Improper drift assessment | Recalibrate toxic vapor analyzer for proper drift assessment |
| Technician attempts to transfer monitoring data before conducting an end-of-day drift assessment. | End-of-day drift assessment is required before transferring | Perform drift assessment |
| No receipt of signal corresponding to technician code | No technician code | Enter technician code prior to deployment |
| No input for confirming date/time on handheld PC | Date/time on handheld PC must be confirmed before deployment | Confirm date/time on handheld PC |
| No input for confirming toxic vapor analyzer identification number | No toxic vapor analyzer ID | Enter toxic vapor analyzer ID before deployment |
| Selection of a component located in a confined space | Display site specific protocol for monitoring components in confined spaces | Obtain signature of their fire watch. |
| Selection of a component that is difficult to monitor | Display site specific protocol for monitoring difficult to monitor component | Confirm protocol standards |
| Selection of a component that requires a ladder | Display site specific protocol for monitoring components with a ladder | Confirm protocol standards |
| Selection of a component that requires a man lift | Display site specific protocol for monitoring with a man lift | Confirm protocol standards |
| Selection of a component that requires a crane | Display site specific protocol for monitoring with a crane | Confirm protocol standards |
| Selection of a component that requires a scaffold | Display site specific protocol for monitoring with a scaffold. | Confirm protocol standards |
| Selection of a component that requires a harness and lanyard | Display site specific protocol for monitoring with a harness and lanyard. | Confirm protocol standards |
| Selection of a component that was previously labeled as difficult to find (DTF) and determined as a triggering event | Component need resolution | Confirm location and status of component |
| Tech is injured | Display site specific protocol for first aid treatment and map of first aid station | Record type of first aid obtained, details of injury, and person to whom reported |
| Technician has begun monitoring a component | Status bar indicating the amount of time that has lapsed and the minimum amount of time required | Cannot save reading until minimum time has been met |
| A leak is identified on a component having a diameter greater than a predetermined value | Monitor longer and status bar is reset to capture additional time | Cannot save reading until additional monitoring time has been met |

Various implementations described herein are configured to identify triggering events and guarantee technician awareness of the triggering events by intervening in the operation of the underlying program and displaying a pre-set array of alerts, instructions and action steps to be taken. In this manner, various implementations described herein may ensure proper assessment of the triggering events on the part of the technician by prompting the appropriate response to an array of questions and then comparing the responses given against the set of appropriate responses. In addition, various implementations described herein may ensure sufficient documentation of the assessment and the required action steps. The alert, awareness and assessment loop may ensure the technician's proper response to a triggering event according to a previously designated set of protocols, instructions, checklists and/or timelines. Various implementations described herein may also document the successful completion of each step along with the technician's assessment of any relevant circumstance associated with the triggering events and follow up steps. In the end, the triggering event monitoring program may report the circumstances and final result of each intervention to a software program that enables management to review and respond appropriately to each intervention.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:
receiving a request from a user to display an assignment for monitoring one or more Leak Detection And Repair (LDAR) components for fugitive emissions;
displaying the assignment on a computer display, wherein the assignment lists one or more actual LDAR components that exist in an area and one or more artificial LDAR components that do not exist in the area;
receiving information from the user regarding the one or more actual LDAR components or the one or more artificial LDAR components displayed as part of the assignment on the computer display; and
determining, by a computer, whether the information is for the one or more artificial LDAR components displayed as part of the assignment on the computer display.

2. The computer implemented method of claim 1, further comprising if the information indicates that the one of the artificial LDAR components does not exist or is unavailable, then displaying at the computer display a message commending the user.

3. The computer implemented method of claim 2, wherein the message is displayed after receiving information regarding all of the artificial LDAR components listed in the assignment.

4. The computer implemented method of claim 1, further comprising if the information provides a description of the one of the artificial LDAR components, then displaying at the computer display a message instructing the user to stop monitoring.

5. The computer implemented method of claim 4, wherein the message further comprises instructing the user to report to the user's supervisor.

6. The computer implemented method of claim 1, further comprising if the information indicates a location of the one of the artificial LDAR components in the area, then displaying at the computer display a message instructing the user to stop monitoring.

7. The computer implemented method of claim 1, further comprising if the information indicates an existence of the one of the artificial LDAR components in the area, then displaying a message at the computer display instructing the user to stop monitoring.

8. The computer implemented method of claim 1, further comprising:
storing the information in a report; and
sending the report to the user's supervisor.

9. The computer implemented method of claim 8, further comprising:
receiving a request to display the report;
prompting the user for a password;
receiving the password; and
displaying the report if the password is correct.

10. The computer implemented method of claim 1, wherein the computer is a handheld personal computer.

11. The computer implemented method of claim 1, further comprising adding the one or more artificial LDAR components to the assignment.

12. The computer implemented method of claim 1, further comprising modifying the assignment while the technician is monitoring the actual LDAR components.

13. The computer implemented method of claim 1, further comprising inserting the artificial LDAR components into the assignment while the technician is monitoring the actual LDAR components.

14. The computer implemented method of claim 1, further comprising randomly inserting the artificial LDAR components into the assignment prior to displaying the assignment.

15. The computer implemented method of claim 1, further comprising inserting the artificial LDAR components into the assignment at random times while the technician is monitoring the actual LDAR components.

16. The computer implemented method of claim 1, wherein the artificial components comprise identifications that do not correspond to the actual LDAR components that exist in the area.

17. The computer implemented method of claim 4, wherein the message is displayed after receiving information regarding all of the artificial LDAR components listed in the assignment.

18. The computer implemented method of claim 6, wherein the message is displayed after receiving information regarding all of the artificial LDAR components listed in the assignment.

19. The computer implemented method of claim 6, wherein the message further comprises instructing the user to report to the user's supervisor.

20. The computer implemented method of claim 7, wherein the message is displayed after receiving information regarding all of the artificial LDAR components listed in the assignment.

21. The computer implemented method of claim 7, wherein the message further comprises instructing the user to report to the user's supervisor.

* * * * *